Aug. 21, 1945.  E. J. MOFFITT  2,383,335
TRIMMING TOOL
Filed Nov. 18, 1943  3 Sheets-Sheet 1
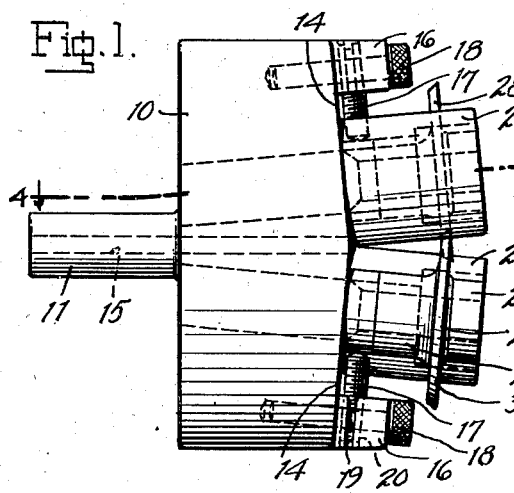
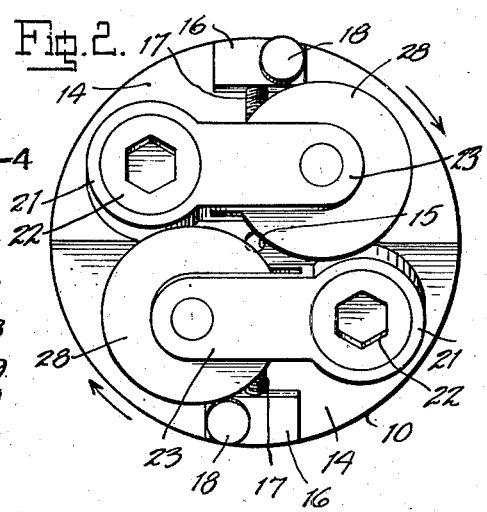
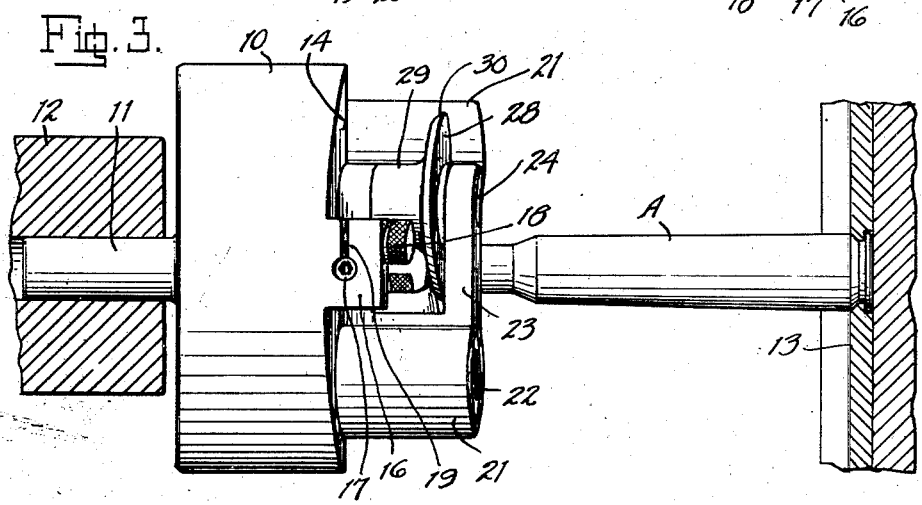
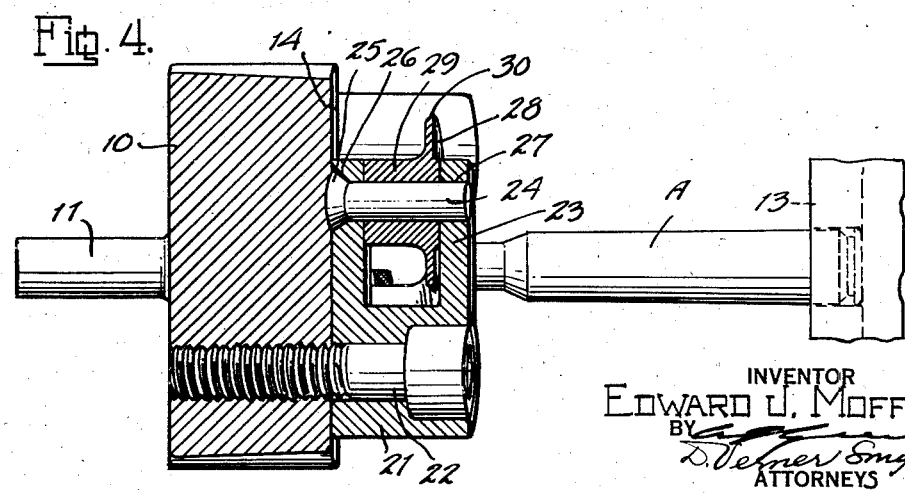
INVENTOR
EDWARD J. MOFFITT.
BY
ATTORNEYS

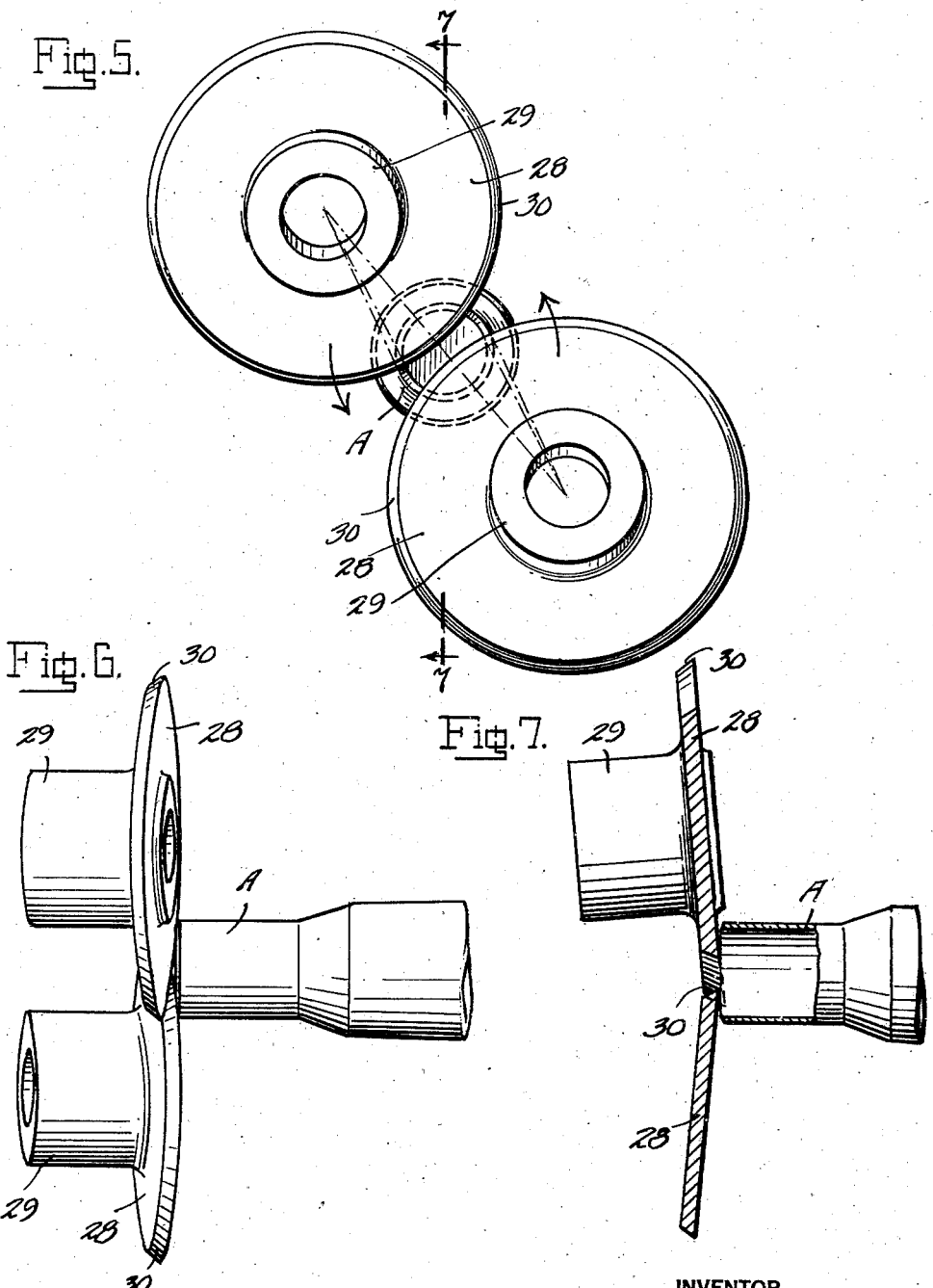

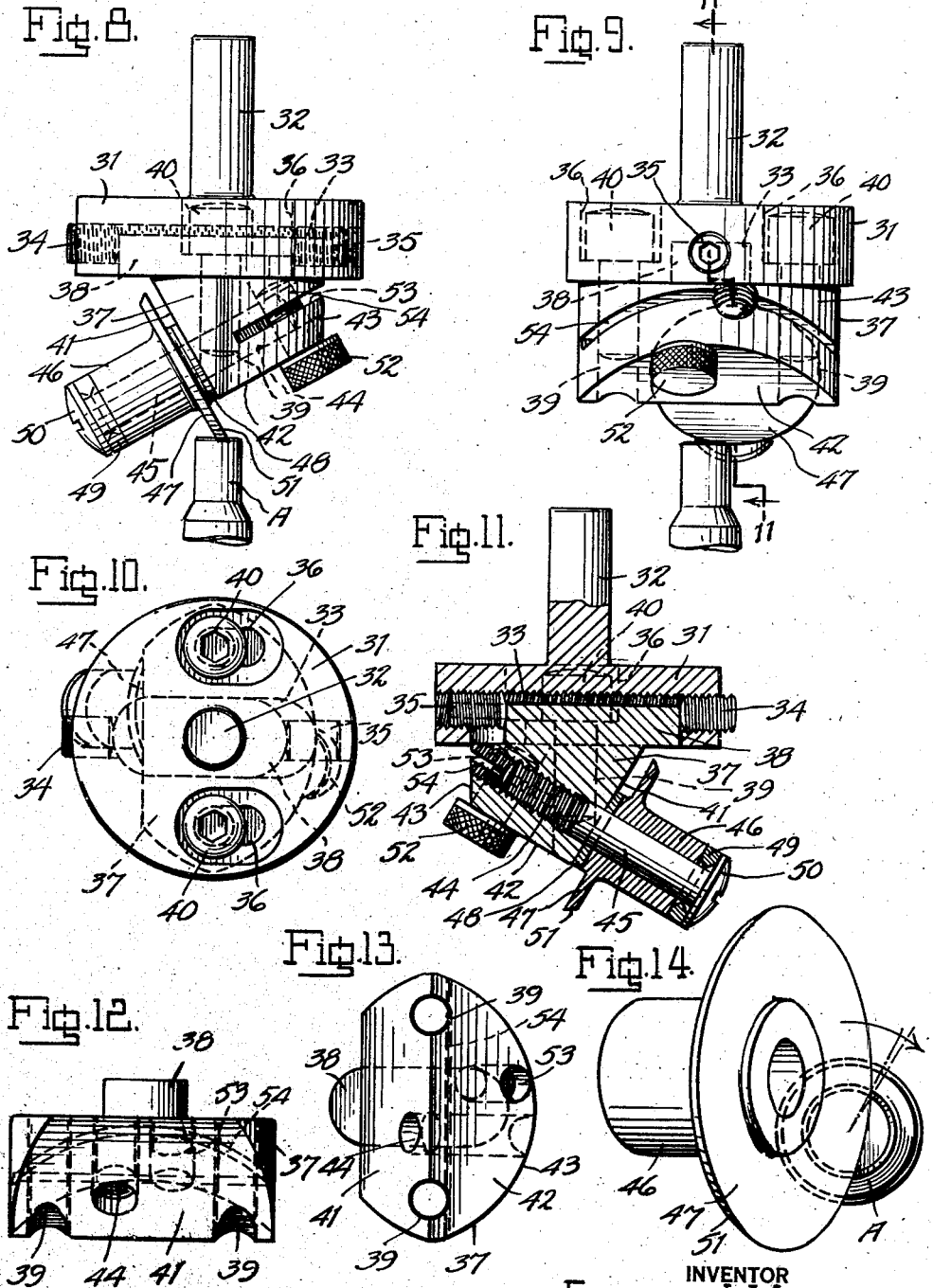

Patented Aug. 21, 1945

2,383,335

UNITED STATES PATENT OFFICE 2,383,335

TRIMMING TOOL

Edward J. Moffitt, Lakewood, Colo., assignor to Remington Arms Company, Inc., Bridgeport, Conn., a corporation of Delaware Application November 18, 1943, Serial No. 510,729

4 Claims. (Cl. 29—105)

The present invention relates to an improvement in trimming tool, particularly for producing a finishing trim cut exteriorly of the edge of the open end of a tubular object, as for instance the mouth end of a cartridge case. An object of the invention is to provide a tool of this character wherein a smooth and uniform trimming cut may be produced upon cartridge cases, or other similar articles, formed of relatively soft brass or of relatively hard steel, without producing a burr upon the inner periphery of the open end.

A further object is to provide a tool of this character wherein the cutting action is in the nature of a slicing cut, and wherein the cutting wheel is rotatably mounted with its axis inclined to, and offset from the axis of rotation of the trimming tool, and whereby the cutting wheel is free to turn about its own axis, to the end that its moving cutting edge carries away the heat of cutting better than a stationary tool, and a new cutting edge is constantly presented to the work, thereby adding greatly to the production capacity and period of use of the tool before requiring sharpening and resetting.

Another object is to provide a trimming tool in which the cutting wheel may be conveniently adjusted with extreme accuracy in relation to the work, to establish the desired cutting angle and point of contact of the cutting edge with the circular mouth edge of the work. In particular it has been found that an arrangement of the cutting edge with the point of engagement with the inner periphery of the cartridge case mouth slightly in advance of the point of engagement with the outer periphery is especially efficient in preventing the formation of a burr upon the inner periphery and in removing the cut particles outwardly.

It is proposed according to one embodiment of the invention to provide a plurality of circular cutting elements, and it is an object of the invention in this connection to provide adjustment means whereby the plurality of cutting elements may be adjusted accurately with respect to each other and irrespective of the relative diameters of the cutting elements, it being possible, according to the invention, to provide cutting elements of different diameters and to adjust them into cooperative engaging relation with the work piece.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a top plan view of a trimming tool, according to one illustrated exemplary embodiment of the invention.

Fig. 2 is a front elevation.

Fig. 3 is a side elevation, showing the trimming tool mounted in the rotary head of the trimming machine, and in cutting relation with the work piece, shown for example as a cartridge case.

Fig. 4 is a horizontal sectional plan view, taken along the line 4—4 of Fig. 1, and showing the tool in cutting relation with the cartridge case.

Fig. 5 is a diagrammatic view, on an enlarged scale, showing the cutting relation of the cutting elements, which are shown from their inner side.

Fig. 6 is a top plan view of the cutting elements and cartridge case, as shown in Fig. 5.

Fig. 7 is a vertical sectional view, taken along the line 7—7 of Fig. 5.

Fig. 8 is a side elevation of a modified form of the invention, wherein a single cutting element is employed, and showing the tool in cutting relation with the mouth end of a cartridge case.

Fig. 9 is a front elevation.

Fig. 10 is a top plan view.

Fig. 11 is a vertical sectional view, taken along the line 11—11 of Fig. 9.

Fig. 12 is a rear elevation of the tool holder element of the tool.

Fig. 13 is a bottom plan view thereof.

Fig. 14 is a diagrammatic top plan view, on an enlarged scale, showing the cutting relation of the tool with the work.

Similar reference characters indicate corresponding parts throughout the several figures of the drawings.

Referring to the drawings, and particularly to Figs. 1 to 7 thereof, the trimming tool, according to the illustrated exemplary embodiment of the invention shown therein, comprises a head or body member 10 of cylindrical block form provided axially at its rearward side with a shaft extension 11 adapted to be secured within the rotatable spindle 12 of the trimming machine, this spindle being shown as mounted for horizontal reciprocation to bring the tool into and out of relation with the work piece. It will be understood, of course, that the tool may be used in a vertical type machine in which case the rotary spindle is mounted for vertical reciprocation to bring the tool into and out of relation with the work piece. The work piece is illustrated by way of example as a cartridge case A, a succession of such cases adapted to be intermittently fed into coaxial relation with the tool by a suitable reciprocating feed 13 which rigidly supports the head end of the case during the trimming operation upon its mouth end.

The forward face of the head 10, or the bottom face in the case of its use in a vertical type machine, is inclined at each side from the diametric center line to the peripheral edge, as at 14—14, the inclination of the planes of the inclined faces being for example of the order of 85° to the diametric axial plane of the head. An axial passage 15 is preferably provided through the head and its shaft extension. Each of the faces 14 is provided centrally at its periphery with an integrally formed bracket projection 16 having its inner face at a right angle to the face 14 and its forward face parallel thereto, and in which is mounted an adjustment screw 17 arranged for movement along a radial line parallel to the inclined face 14. The position of the adjustment screw is fixed by means of a clamping screw 18 secured in the head and traversing a slit 19 extending from one side wall of the bracket to the threaded passage 20 of the adjusting screw, and whereby the passage is rendered yieldable so that it may be clamped tightly about the adjusting screw upon tightening of the clamping screw 18, and upon loosening of the screw 18 will yield to permit adjustment of the screw 17.

Upon each of the inclined faces 14 there is mounted a trimming tool holder, each being arranged in opposite relation to the other, so that they are in the same relation to the direction of rotation of the head 10. Each of these holders consists of a hub 21 secured upon the face 14 by means of a socket head bolt 22 screwed into the head 10 and disposed at a right angle to the inclined face 14. The hub is provided with a yoke arm extension 23, in the outer end of which is supported the tool carrying shaft 24, this shaft being preferably provided at its inner end with a conical head 25 engaged in the conically countersunk bearing aperture 26 of the inner arm portion of the yoke extension, while its outer end is engaged in the cylindrical aperture 27 of the outer arm portion. The shaft is preferably engaged in the apertures 26 and 27 with a light pressed fit. Upon the shaft within the two sides of the yoke arm there is engaged the rotary cutter wheel 28, its hub 29 being engaged upon the shaft with a running fit. The cutter wheel is provided with a beveled periphery 30 forming a circular cutting edge with the forward face of the wheel, the wheel being arranged for free rotation in a plane parallel to the plane of the inclined face 14 and about an axis inclined to and spaced outwardly from the axis of the head 10. The adjusting screw 17 is engaged with the inner portion of the yoke arm to adjustably support the holder in any position of angular adjustment about the bolt 22, such adjustment bringing the cutting edge of the wheel into the desired cutting relation with the mouth edge of the tubular work piece. In its operative relation the cutting wheel holder is fixed against the inclined face 14 by tightening the bolt 22.

In operation the work piece, as for instance the cartridge case A, is fed into line with the rotating trimming tool, which thereupon moves toward the mouth of the case to bring the peripheral cutting edges of the cutting wheels into engagement with the edge of the mouth, the head 10 being rotated in clockwise direction, as seen from the outer side in Fig. 2, and in counterclockwise direction, as seen from the inside in Fig. 5. The cutting wheels engage the outer surface of the mouth at diametrically opposed points and through the angular mounting of the wheels, the cutting edge produces a chamfered cut upon the mouth. As shown by the dot-and-dash lines in Fig. 5, the point of engagement of the cutting edge of each wheel with the inner periphery of the mouth is slightly in advance of the point of engagement with the outer edge, thereby producing a slicing cut from the inner to the outer edge, preventing the formation of a burr upon the inner edge, and removing the chips outwardly. This slicing engagement also tends to impart relative turning movement to the freely rotatable cutting wheel as it is revolved with respect to the cartridge case, and consequently a new portion of the cutting edge is continuously brought into operative cutting engagement with the case. This constant renewal of the cutting edge prevents excessive wearing at any one point, distributes the wear evenly, and enables a cutting wheel to be used in production for a greatly increased period of time over previous types of stationary cutters. The slicing action of the moving or floating cutting wheel also carries away the heat of cutting more quickly and effectually than a stationary cutter.

The cutting wheels may be adjusted as desired to establish their proper cutting relation with the edge of the work piece and to accurately align the two wheels with each other, the angular position of the cutting wheels bringing about a simultaneous horizontal and vertical adjustment as the wheel carrying yoke member is angularly adjusted over the inclined face 14 of the head block. The independent adjustment of the two cutting wheel holders permits the use of cutting wheels of different sizes for the purpose of producing, through variation in diameter and curvature, a different characteristic in the cut of one wheel following the cut of the other. For instance, one cutting wheel may produce a relatively coarse cut, while the other produces a finishing cut.

In Figs. 8 to 14 there is illustrated a modified form of the invention wherein a single cutting wheel is employed, and wherein the trimming tool is preferably mounted vertically with its vertical axis of rotation in alignment with the vertical axis of the cartridge case. The trimming tool comprises a circular head or block member 31 provided centrally at its upper side with a vertical shaft extension 32 adapted for engagement in the trimming machine spindle, and provided in its lower side with a diametrically disposed slot recess 33, at the ends of which there are respectively provided set screws 34 and 35 for adjustably positioning the tool holder member within the slot recess, as will presently more fully appear. At each side of the slot recess there are provided counterbored bolt receiving slots 36—36 for the purpose of receiving bolts for securing the tool holder to the head.

The tool holder 37 is provided at its upper side with a diametric rib 38 slidably engaged within the slot recess 33, and at each side of which is provided a vertically disposed threaded passage 39 for receiving the securing bolt 40 engaged in each of the counterbored slots 36 of the head. It will be observed that by losening the bolts 40 the tool holder may be laterally adjusted by screwing in or backing out the respective set screws 34 and 35, the adjusted position being determined by the position of the set screws and fixed by securing of the bolts 40.

The tool holder is provided at its rearward side with a downwardly and inwardly inclined flat face 41 and at its forward side with a downwardly and inwardly inclined flat face 42 disposed in a plane at right angles to the plane of the face 41, the forward wall 43 above the forward face 42 being of substantially cylindrical form. The holder is provided in a vertical plane parallel to and spaced from its diametric axial plane with a threaded passage 44 extending forwardly from the inclined face 41 with its axis at right angles to the plane of this face and parallel to the forward inclined face 42, and has screwed therein the threaded end of a cutter wheel supporting pin or bolt 45. The hub 46 of the cutter wheel 47 is mounted upon the projecting shaft portion of the pin 45 for free rotation thereon, a spacing washer 48 being disposed between the inner end of the hub and the inclined face 41, and a spacing washer 49, having a V-cross section inner periphery being disposed between the outer end of the hub and the head 50 of the pin. The cutting periphery 51 of the wheel is disposed in an inclined plane parallel to the plane of the rearward inclined face 41 and is preferably intersected at its lower portion by the central axis of the tool.

The pin 45 is fixed in its adjusted position in the holder by means of a clamping screw 52 engaged in a threaded passage 53, the head of the screw bearing upon the inclined face 42 and the screw traversing a slot 54 cut inwardly from the cylindrical wall 43 in parallel and centrally aligned relation with the axis of the pin 45, so that it bifurcates the threaded passage 44. Tightening of the screw causes the passage to bind upon the pin to fix its position, while loosening relieves the binding action and permits the bolt to be adjusted or removed.

In operation the single cutting wheel is brought into contact with the mouth of the cartridge case, the offset turning axis of the wheel with respect to the vertical axis of rotation of the tool causing the cutting edge of the wheel to engage the mouth of the cartridge case exteriorly with a slicing action substantially similar to the cutting action of the cutting wheels of the first embodiment of the invention. However, the engagement of the peripheral cutting edge of this single cutting wheel with the cartridge case is at the rearward or beveled side of the wheel, as distinguished from the first embodiment, where the engagement of the wheels with the cartridge case is at the forward or flat face side of the wheel. As shown diagrammatically by the dot-and-dash lines in Fig. 14, the disposition of the cutting wheel edge with respect to the mouth of the cartridge case is such that the point of engagement of the cutting edge with the inner periphery of the mouth is slightly in advance of the point of engagement with the outer periphery, thus producing a slicing action which prevents formation of a burr upon the inner periphery and effectually removes the chips outwardly. The engagement is also such that the cutting action causes the wheel to be continuously turned about its axis during the rotation of the trimming tool, so that a new cutting surface is constantly brought into place, thus better carrying away the heat of cutting and distributing the cutting action over the entire periphery of the wheel. By lateral adjustment of the cutting wheel holder in the head the angle at which the cutting edge cuts across the mouth of the cartridge case may be adjusted as desired in order to bring about the most effectual cutting action.

The form of the invention illustrated in the drawings and described herein is typical and illustrative only, and it is evident that the invention is capable of embodiments in other forms, all falling within the scope of the appended claims, which are to be broadly construed.

What is claimed is:

1. In a tool, a rotatable head, a tool holder pivotally mounted on said head for adjustment in a plane inclined to a plane substantially perpendicular to the axis of rotation of said head, and a tool carried by said holder on an axial line disposed at substantially right angles to said plane of adjustment, said tool having a circumferential workpiece engaging edge disposed in a plane parallel to said plane of adjustment and intersecting said rotational axis, said edge being adapted to make an outwardly spiralling trimming cut on the open end of a tubular workpiece disposed coaxially with said rotational axis during the rotation of said head.

2. In a tool, a rotatable head, a tool holder pivotally carried by said head for swinging adjustment in a plane inclined to a plane substantially perpendicular to the axis of rotation of said head, and a tool rotatably mounted on said holder on an axial line disposed in spaced parallel relation to the pivotal axis of said holder, said tool having a circumferential workpiece engaging edge adapted to make an outwardly spiralling trimming cut on the open end of a tubular workpiece disposed coaxially with the rotational axis of said head during the rotation of said head.

3. In a tool, a rotatable head having a face inclined to the axis of rotation of said head, a tool holder pivotally mounted on said face for adjustment in a plane parallel to said face, and a tool carried by said holder on an axial line disposed at substantially right angles to said inclined face, said tool having a circumferential workpiece engaging edge disposed in a plane parallel to said inclined face and intersecting the rotational axis of said head, said edge being adapted to make an outwardly spiralling trimming cut on the open end of a tubular workpiece disposed coaxially with said rotational axis during the rotation of said head.

4. In a tool, a rotatable head having a plurality of faces oppositely inclined to the axis of rotation of said head, a plurality of tool holders carried by said head for adjustment parallel to each of said faces, an axis carried by each of said holders, and a tool mounted on each axis, each axis being substantially perpendicular to the plane of its tool and disposed at right angles to said respective inclined faces, said tools having circumferential workpiece engaging edges disposed in planes parallel to said respective inclined faces and intersecting the rotational axis of said head, said edges being adapted to make an outwardly spiralling trimming cut on the open end of a tubular workpiece disposed coaxially with said rotational axis during the rotation of said head.

EDWARD J. MOFFITT.